US008118411B2

(12) United States Patent
Watanabe

(10) Patent No.: US 8,118,411 B2
(45) Date of Patent: Feb. 21, 2012

(54) INKJET HEAD MANUFACTURING METHOD AND INKJET HEAD

(75) Inventor: Hideo Watanabe, Tokyo (JP)

(73) Assignee: Konica Minolta IJ Technologies, Inc. (JP)

( * ) Notice: Subject to any disclaimer, the term of this patent is extended or adjusted under 35 U.S.C. 154(b) by 1007 days.

(21) Appl. No.: 11/869,169

(22) Filed: Oct. 9, 2007

(65) Prior Publication Data

US 2008/0088679 A1 Apr. 17, 2008

(30) Foreign Application Priority Data

Oct. 13, 2006 (JP) ................................ 2006-280646

(51) Int. Cl.
*B41J 2/045* (2006.01)
*B41J 2/17* (2006.01)
*C03C 15/00* (2006.01)

(52) U.S. Cl. ................................ 347/69; 347/84; 216/41

(58) Field of Classification Search ..................... 347/69
See application file for complete search history.

(56) References Cited

U.S. PATENT DOCUMENTS

2003/0145464 A1 8/2003 Linliu et al.
2006/0017778 A1 1/2006 Okuno

FOREIGN PATENT DOCUMENTS

| | | | |
|---|---|---|---|
| EP | 0870616 | A | 10/1998 |
| JP | 2001088309 | A | 4/2001 |
| JP | 2002160373 | A | 6/2002 |
| JP | 2004-90374 | | 3/2004 |
| JP | 2004268315 | A | 9/2004 |
| JP | 2006-35454 | | 2/2006 |

OTHER PUBLICATIONS

European Search Report for European Application No. EP-07254005 dated Dec. 27, 2007.
Japanese Office Action, Notice of Reasons for Refusal, for Japanese Patent Application No. 2006-280646 mailing date of Sep. 20, 2011 with English translation.

*Primary Examiner* — Omar Rojas
(74) *Attorney, Agent, or Firm* — Cantor Colburn LLP

(57) ABSTRACT

A flow path regulating member 3 is formed on the rear surface of the head chip 1A, wherein the channels 12 and 13, and drive walls 11 made up of piezoelectric elements are arranged alternately, the apertures of the channels 12 and 13 are arranged on the front side and rear side, and drive electrodes 14 are formed in channels 12 and 13, by the step of providing a lamination film according to the process wherein a mask layer without having been etched at the time of dry etching of an organic film is patterned on the surface of the organic film so as to conform to the channel 13 for regulating an ink flow path and performing dry etching from the side of the mask layer and removing the organic film at other than the site coated with the mask layer.

14 Claims, 9 Drawing Sheets

INKJET HEAD MANUFACTURING METHOD AND INKJET HEAD

This application is based on Japanese Patent Application No. 2006-280646 filed on Oct. 13, 2006, in Japanese Patent Office, the entire content of which is hereby incorporated by reference.

FIELD OF THE INVENTION

The present invention relates to an inkjet head manufacturing method and an inkjet head, particularly to a method of manufacturing an inkjet head wherein a flow path regulating member for regulating the flow path of ink into the channel is arranged on the rear side of the head chip, and the inkjet head manufactured thereby.

BACKGROUND OF THE INVENTION

The conventional art has provided a share mode type inkjet head wherein voltage is applied to the electrode formed on a drive wall for separating the channel so that the drive wall is subjected to shear deformation, and the ink inside the channel is discharged out of the nozzle using the pressure generated inside the channel at this time. As this share mode type inkjet head, an inkjet head provided with the so-called harmonica type head chip is known, wherein the drive walls made up of piezoelectric elements and the channels are arranged alternately, and a channel aperture is arranged on each of the front side and rear side (Patent Document 1, 2).

In the case of an inkjet head having such a harmonica type head chip, ink is supplied into each channel from the rear side of the head chip. Accordingly, an ink manifold is connected to the rear side of the head chip, and the ink stored in this ink manifold is supplied to each channel.

Incidentally, as disclosed in the Patent Documents 1 and 2, the rear side of such a head chip is provided with a flow path regulating member for regulating the flow of ink into the channel by reducing the area of the aperture on the rear side of the channel.

FIG. 16 is a rear side view of the head chip 600 connected with a flow path regulating member 500. This drawing illustrates a harmonica type head chip 600 wherein the air channels 601 that do not emit ink and the ink channels 602 that emit ink are arranged alternately.

The flow path regulating member 500 utilizes a plastic film such as a sheet of polyimide having the size capable of covering almost all the surfaces on the rear side of the head chip 600. This film is bonded using adhesives as an epoxy adhesive and others. Here the rear side of each air channel 601 provided on the head chip 600 is completely blocked and an ink inlet 501 is formed so as to conform to each ink channel 602, thereby reducing the area of the aperture on the rear side (on the side supplied with ink) of each ink channel 602. The ink inlet 501 is provided, for example, by laser processing in such a way as to have a diameter smaller than that of the aperture on the rear side of the ink channel 602.

As described above, the area of the aperture on the rear side of the ink channel is reduced by the flow path regulating member 500, whereby easy control of the ink meniscus in the nozzle is ensured and high-speed drive is enabled. Thus, this arrangement provides the advantage of enhancing the drive characteristics.

When all the channels arranged on the head chip are ink channels, the ink inlets of the flow path regulating member are arranged so as to correspond to all the channels.

[Patent Document 1] Unexamined Japanese Patent Application Publication No. 2004-90374

[Patent Document 2] Unexamined Japanese Patent Application Publication No. 2006-35454

When the aforementioned flow path regulating member is connected to the rear side of the head chip, the coated adhesive may ooze from the ink inlet. This requires a large quantity of adhesive to be coated. This involves such problems as the excess adhesive flowing into the channel to block the channel and to cause emission failure, or ink flowing into the air channel due to insufficient coating of the adhesive, with the result that ink inlet is blocked by adhesive.

The connection electrode and others having been pulled out to the rear side of the head chip and having been formed therein will be covered by adhesive and electrical connection cannot be made. When this problem has occurred, it is necessary to remove the unwanted adhesive by dry etching or other means. This requires extra time and effort.

When the flow path regulating member is bonded by the adhesive oozing from the ink outlet, contact pressure cannot be easily applied from the flow path regulating member. The utmost caution must be taken when coating the adhesive and bonding the member. This gives rise to manufacturing difficulties.

Moreover, processing costs cannot be ignored when the ink inlet is processed by laser.

Further, when the area of the aperture on the rear side of the channel is to be reduced by the flow path regulating member, the ink inlet having a smaller area than that of the aperture on the rear side of the channel is formed approximately at the center of the aperture in the conventional flow path regulating member. Thus, the bubble having occurred inside the channel at the time of driving cannot easily get out of the ink inlet, and remains inside the channel. The bubble remaining inside the channel prevents a sufficient amount of the emission pressure from being applied to the ink, with the result that emission failure occurs.

SUMMARY OF THE INVENTION

Thus, the object of the present invention is to provide an inkjet head manufacturing method capable of ensuring that a flow path regulating member is pressed and firmly bonded on the rear side of the harmonica type head chip, wherein there is no concern for possible clogging of the channel due to adhesive or possible oozing of adhesive.

Another object of the present invention is to provide an inkjet head containing a flow path regulating member firmly bonded on the rear side of the harmonica type head chip, wherein there is no concern for possible clogging of the channel due to adhesive or possible oozing of adhesive.

A further object of the present invention is to provide an inkjet head manufacturing method capable of ensuring that a flow path regulating member is pressed and firmly bonded, without any concern for possible clogging of the channel due to adhesive or possible oozing of adhesive, and that, even when the area of the aperture on the rear side of the channel has been reduced, the bubble remaining in the channel is efficiently removed, without bubbles being formed easily.

A still further object of the present invention is to provide an inkjet head containing a flow path regulating member bonded firmly on the rear side of the harmonica type head chip, without any concern for possible clogging of the channel due to adhesive or possible oozing of adhesive; the inkjet head further characterized in that, even when the area of the aperture on the rear side of the channel has been reduced, the bubble remaining in the channel is efficiently removed, without bubbles being formed easily.

Other objects of the present invention will become apparent from the following description:

The aforementioned objects can be achieved by the following:

1. A manufacturing method of an inkjet head having a head chip wherein channels and drive walls configured with piezoelectric elements are arranged alternately, and apertures are arranged respectively at front and rear surfaces of the channel in which a drive electrode is formed and a flow path regulating member arranged at the rear surface of the head chip to regulate ink flow into the channel, wherein shear deformation is caused at the drive wall by applying a voltage so that ink in the channel is emitted, the manufacturing method including steps of: providing a multilayer film to be adhered onto the rear surface of the head chip, wherein a mask layer is patterned on an organic layer so that the mask layer not etched by dry etching corresponds to the channels where ink flow is to be regulated; and removing a portion of the organic film which is not covered by the mask layer by dry etching so as to form the flow path regulation member.

2. An inkjet head, wherein shear deformation is caused at a drive wall by applying a voltage so as to emit ink in a channel, including: a head chip wherein the channels and the drive walls configured with piezoelectric elements are arranged alternately, apertures are arranged respectively at a front surface and rear surface of the head chip, and a drive electrode is formed in each channel; and a flow path regulating member arranged at the rear surface of the head chip to regulate ink flow into the channel, wherein the flow path regulating member is formed by a multilayer which is made in a way where a mask layer which cannot be etched by dry etching is formed on a surface of an organic film and the multilayer is etched by dry etching.

DETAILED DESCRIPTION OF THE PREFERRED EMBODIMENT

Figure 1:
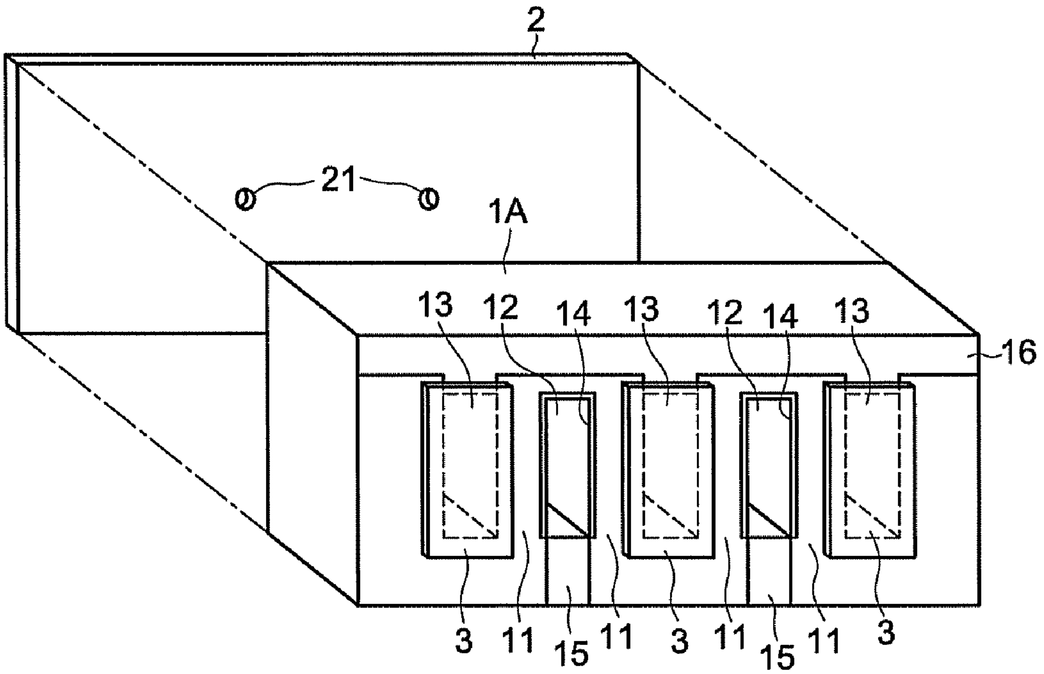
FIG. 1 is a perspective view showing the head chip portion of the inkjet head as a first embodiment as viewed from the rear side.

The following describes the embodiments of the present invention with reference to drawings:

FIG. 1 is a perspective view showing the head chip portion of the inkjet head as a first embodiment as viewed from the rear side.

In the drawing, the reference numeral 1A denotes a head chip and 2 indicates a nozzle plate connected with the front side of the head chip 1A.

In this Specification, the surface on the side wherein ink is emitted from the head chip is referred to as the "front side" and the surface opposite thereto is called the "rear side". The outer surfaces on the upper and lower portions in the drawing, sandwiching the channel juxtaposed in the head chip, are called the "upper side" and "lower side", respectively.

The drive walls 11 made up of piezoelectric elements, and channels 12 and 13 are arranged alternately on the head chip 1A. In this drawing, five channels 12 and 13 are illustrated by way of an example, without the number of the channels 12 and 13 being restricted thereto.

The head chip 1A is an independent channel type head chip wherein channels that emit ink (referred to as "ink channels" in some cases) 12 and the channels that do not emit ink (referred to as "air channels" in some cases) 13 are arranged alternately. Each of the channels 12 and 13 is configured in such a way that the walls on both sides rise almost vertical with respect to the upper side and lower side of the head chip 1A, and are parallel to each other.

Figure 2:
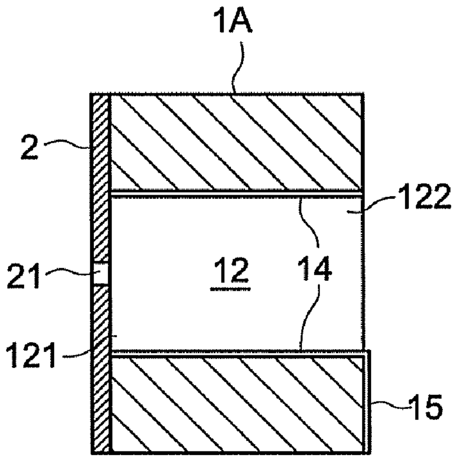
FIG. 2(*a*) is a cross sectional view of the ink channel portion of the inkjet head of FIG. 1, with FIG. 2(*b*) being a cross sectional view of an air channel.
Figure 2:
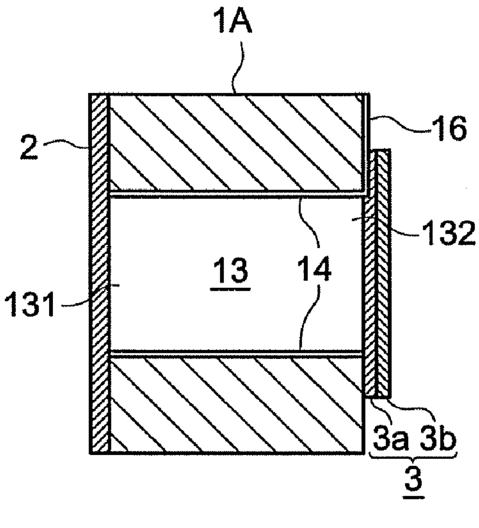

FIG. 2(*a*) is a cross sectional view of the inkjet head 12 of FIG. 1, and FIG. 2(*b*) is a cross sectional view of an air channel 13.

The apertures 121 and 131 on the front side of each of the channels 12 and 13, and the apertures 122 and 132 on the rear side are arranged face to face with each other on the front side and rear side of the head chip 1A. Each of the channels 12 and 13 is designed in a straight form with a very small change in size and shape along the length from the apertures 122 and 132 on the rear side to the apertures 121 and 131 on the front side.

A drive electrode 14 made up of a metallic film such as Ni, Co, Cu and Al is formed in a closely linked configuration on the inner surface of each of the channels 12 and 13.

On the rear side of the head chip 1A, the connection electrodes 15 electrically connected with the drive electrode 14 in each of the ink channels 12 are formed by being separately pulled out downward in the drawing. One common electrode 16 electrically connected with all of the drive electrodes 14 inside each of the air channels 13 is formed by being pulled out upward in the drawing, in the direction opposite to the connection electrode 15.

Figure 3:
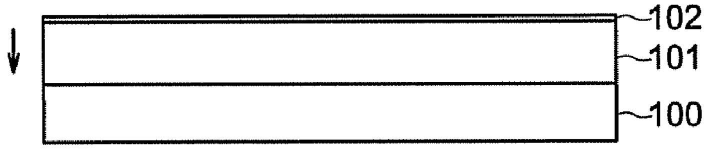
FIGS. 3(*a*) through (*e*) are explanatory diagrams representing the head chip manufacturing process.
Figure 3:
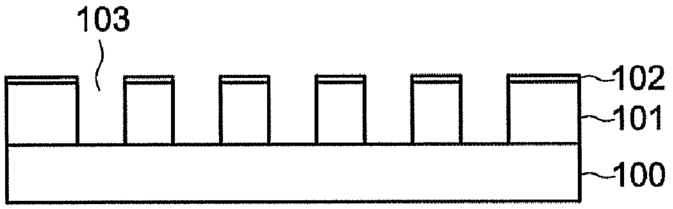
Figure 3:
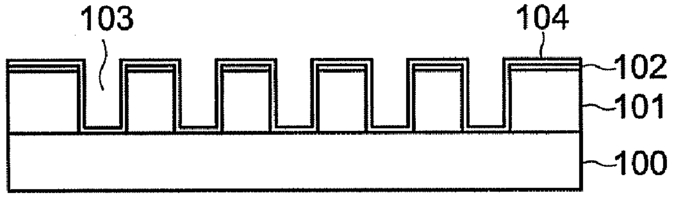
Figure 3:
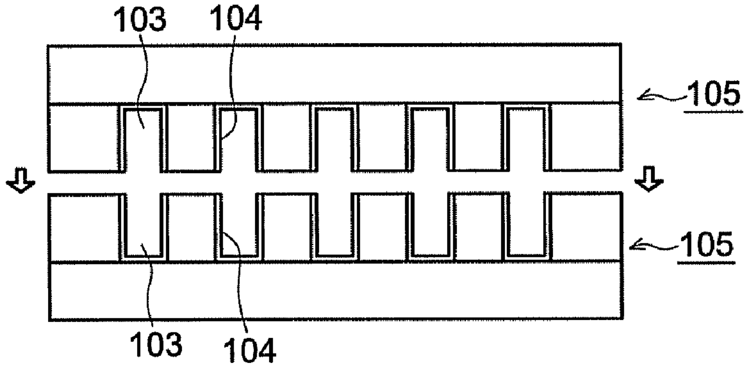
Figure 3:
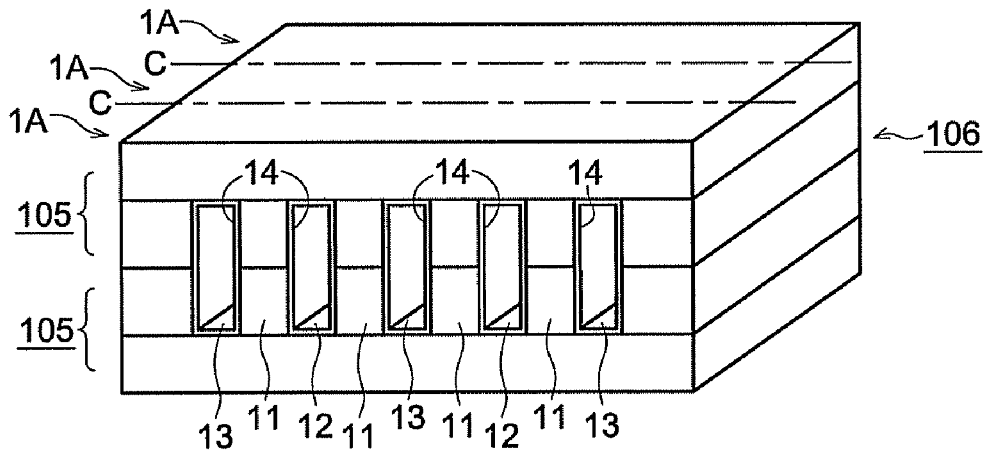
Figure 4:
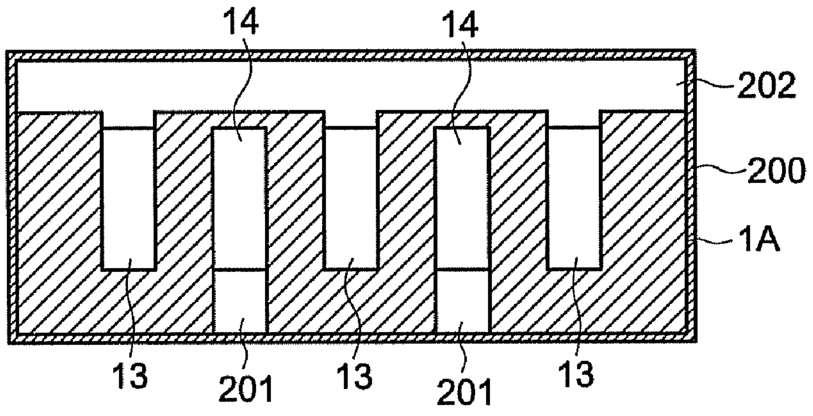
FIG. 4 is an explanatory diagram representing the head chip manufacturing process.

The following describes an example of manufacturing such as head chip 1A with reference to FIGS. 3 and 4 without the present invention being restricted thereto.

The piezoelectric element substrate 101 made of polarized PZTs is connected to one substrate 100 using an epoxy based adhesive, and a photosensitive resin film 102 is bonded on the surface of the piezoelectric element substrate 101 (FIG. 3(*a*)).

Then from the side of the photosensitive resin film 102, a plurality of parallel grooves 103 are ground using a dicing blade and others. Each of the grooves 103 is ground from one end of the piezoelectric element substrate 101 to the other end at such a predetermined depth as to almost reach the substrate 100. This arrangement provides a straight form with a very small change in size and shape along the length (FIG. 3(*b*)).

After that, from the side wherein the grooves 103 have been ground, electrode forming metals such as Ni, Co, Cu, Al and others are applied by sputtering method, vapor deposition method or other means, so that a metallic film 104 is formed on the upper side of the resin film 102 having been left ungrounded, and on the inner surface of each groove 103 (FIG. 3(*c*)).

This is followed by the step of removing the photosensitive resin film 102, together with the metallic film 104 formed on the surface thereof. This will yield a substrate 105 wherein the metallic film 104 is formed only on the inner surface of each groove 103. Two substrates 105 having been formed in the similar manner are prepared, and a positioning step is taken to ensure that the grooves 103 of each substrate 105 will match with each other. Then an epoxy based adhesive or the like is used to bond them together (FIG. 3(*d*)).

The head substrate 106 having been produced is cut in the direction perpendicular to the length of the groove 103, whereby a plurality of harmonica type head chips 1A are produced. The grooves 103 are formed into the channels 12 and 13, and the metallic film 104 in each groove 103 is formed into a drive electrode 14. The drive wall 11 is created between the adjacent grooves 103. The width between the cut lines C, C . . . determines the drive length (L) of the ink channel 12 of the head chips 1A, 1A . . . produced separately, and is determined adequately in response to this drive length (FIG. 3(*e*)).

The rear side of the head chip 1A having been obtained is provided with a photosensitive resin film 200 wherein an opening 201 for forming a connection electrode 15, and an opening 202 for forming a common electrode 16 are formed by exposure and development. From the side of the photosensitive resin film 200, such electrode metals are applied, similarly to the case of the metallic film 104, so that the connection electrode 15 and common electrode 16 are formed inside each of the openings 201 and 202 on an selective basis (FIG. 4).

The openings 201 and 202 are preferably provided over all the surfaces of the channels 12 and 13 when consideration is given to the working efficiency in the development and rinsing processes of the photosensitive resin film 200. This preferred arrangement ensures easy removal of the developing solution and rinsing water from the channels 12 and 13.

A nozzle plate 2 is connected to the front side of the head chip 1A in the aforementioned manner as shown in FIG. 1 and FIG. 2. The nozzle plate 2 is provided with a nozzle 21 only at the position conforming to the ink channel 12. Thus, the aperture 131 on the front side of the air channel 13 which does not emit ink is blocked by the nozzle plate 2.

Such a harmonica type head chip 1A is provided with the flow path regulating members 3 for regulating the flow path independently for each air channel 13 to ensure that ink is not supplied to the aperture 132 on the rear side of each air channel 13 since ink is supplied from the rear side. Thus, this aperture 132 is completely blocked.

As shown in FIG. 2(*b*), the flow path regulating member 3 is formed of a laminate which is made up of an organic film layer 3*a* in contact with the rear side of the head chip 1A and a mask layer 3*b* formed on the surface of this organic film layer 3*a*.

A film made of resin that can be patterned by general dry etching can be used as an organic film layer 3*a*. Examples include films made of various types of resins such as polyimide, liquid crystal polymer, aramid and polyethylene terephthalate. Of these examples, a polyimide film characterized by excellent etching property is preferably utilized. Further, to facilitate dry etching, the thinnest possible film is preferably used. Use of an aramid film is preferred because it exhibits high strength despite its property of thickness.

The thickness of the organic film layer 3*a* is preferably in the range of 10 through 100 μm to ensure strength and ease of dry etching.

Further, a metallic film is preferably used because the mask layer 3*b* serves as a masking material in a later dry etching process, and has an excellent resistance during dry etching. The metal that can be used is exemplified by Al, Cu, Ni, W, Ti and Au. Of these, the Al is preferably used because it is less costly, and is characterized by easy patterning.

The mask layer 3*b* is only required to be resistant to dry etching. It is possible to use an inorganic thin film other than the metallic film resistant to dry etching such as silicon oxide film, aluminum oxide film and silicon nitride film. Further, this layer is only required to work as a mask layer 3*b* at the time of termination of dry etching of the organic film 3*a*, despite slight etching at the time of dry etching. Thus, it is possible to use an organic thin film that can be patterned, as exemplified by a photosensitive resist film and a photosensitive polyimide film. Such an organic thin film per se can be patterned, and this feature provides an advantage of simplifying the work process, as compared to the metallic film being patterned.

The thickness of this mask layer 3*b* is preferably in the range of 0.1 through 50 μm from the viewpoint of resistance to dry etching and ease of patterning.

Figure 5:
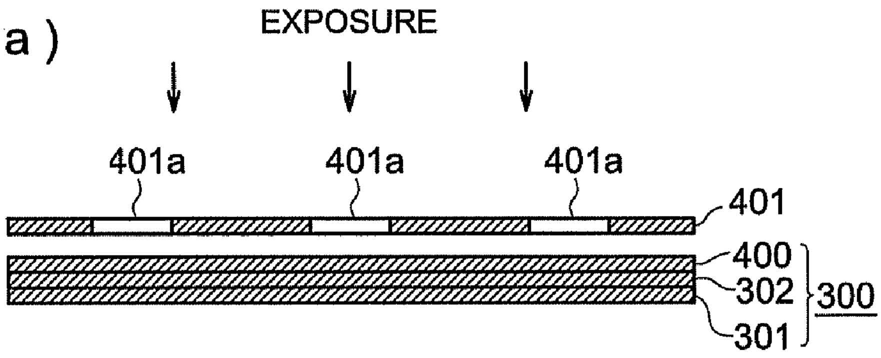
FIG. 5 is a diagram representing the flow path regulating member manufacturing process, wherein (*a*) is a cross sectional view showing that a photo mask is applied on a laminated film coated with resists, and (*b*) is a plane view showing the same as seen from the photo mask side.
Figure 5:
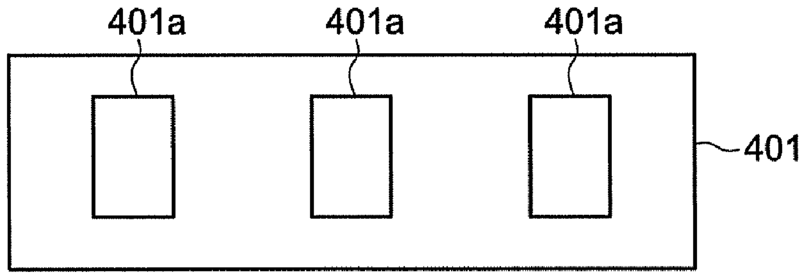

The following describes an example of the method of forming this flow path regulating member 3 with reference to FIG. 5 through FIG. 9:

As shown in FIG. 5(*a*), a lamination film 300 is prepared, wherein a metallic film 302 is formed on the entire surface of the organic film 301 having almost the same area as that of the rear side of the head chip 1A using such a normal thin film patterning technique as sputtering technique. Then the entire surface of this metallic film 302 is coated with a resist 400.

This organic film 301 becomes an organic film layer 3*a* constituting the flow path regulating member 3 later, and the metallic film 302 becomes a mask layer 3*b* constituting the flow path regulating member 3 later. The following describes an example wherein a polyimide film having a thickness of 25

μm is used as an organic film 301, and aluminum having a thickness of 5 μm as a metallic film 302 is sputtered on the surface.

The normal step of photolithography is used for patterning of the resist 400. The reference numeral 401 in FIG. 5 denotes a photo mask. This photo mask 401 has a rectangular opening 401*a* having an aperture area slightly greater than that of the aperture 132 on the rear side of each air channel 13 so as to correspond to each air channel 13 of the head chip 1A. Therefore, light can pass through only this opening 401*a*. When this photo mask 401 is used in the step of exposure, only the resist 400 of the portion to which light is applied is exposed.

Figure 6:
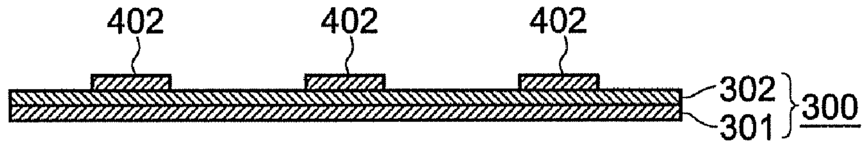
FIG. 6 is a diagram representing the flow path regulating member manufacturing process, wherein (*a*) is a cross sectional view of the laminated film with resists remaining thereon, and (*b*) is a plane view showing the same as seen from the resist side.
Figure 6:
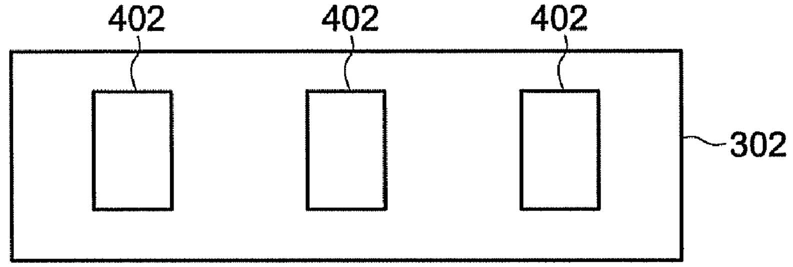

If steps of exposure and development are taken after such a photo mask 401 has been coated on the surface of the resist 400, the resist 402 of independent rectangular pattern remains on the surface of the lamination film 300, as shown in FIGS. 6(*a*) and (*b*).

Figure 7:
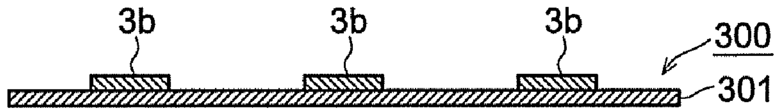
FIG. 7 is a diagram representing the flow path regulating member manufacturing process, wherein (*a*) is a cross sectional view of the laminated film wherein the mask layer is patterned, and (*b*) is a plane view of the same as seen from the mask layer side.
Figure 7:
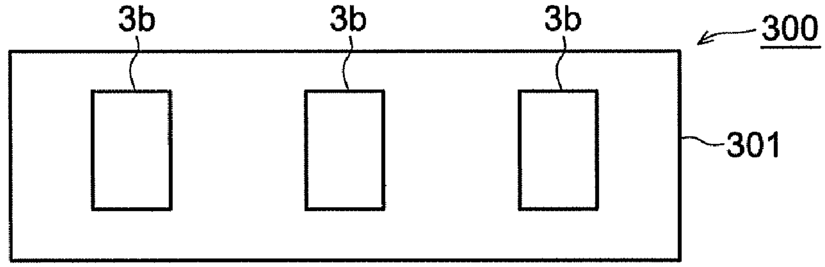

The metallic film 302 not coated with the resist 402 is wet-etched on this lamination film 300. A proper etching solution is selected in conformity to the metal used in the metallic film 302. In this case, phosphoric acid is used to etch the metallic film 302 made of aluminum. After wet etching, unwanted resist 402 is removed. This procedure yields a lamination film 300 wherein the mask layer 3*b* is formed by the metallic film 302 remaining on the surface of the organic film 301, as shown in FIGS. 7(*a*) and (*b*).

Figure 8:
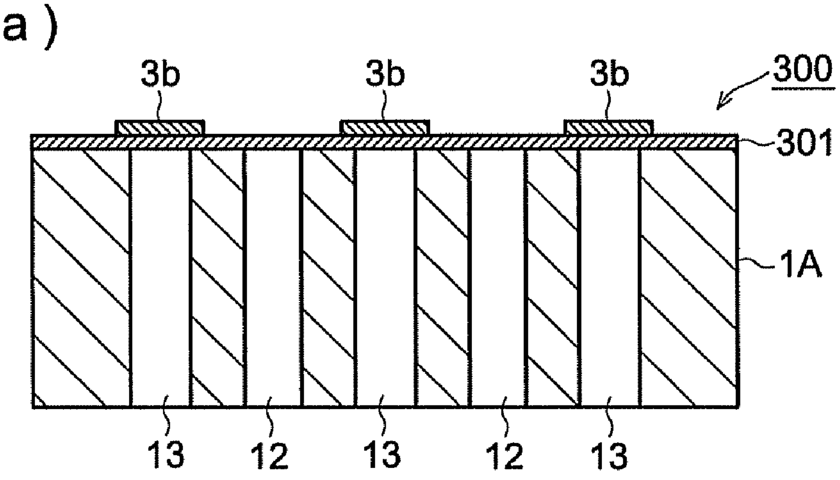
FIG. 8 is a diagram representing the flow path regulating member manufacturing process, wherein (*a*) is a cross sectional view showing that the laminated film of FIG. 7 is bonded on the rear side of the head chip, and (*b*) is a rear side view of the head chip.
Figure 8:
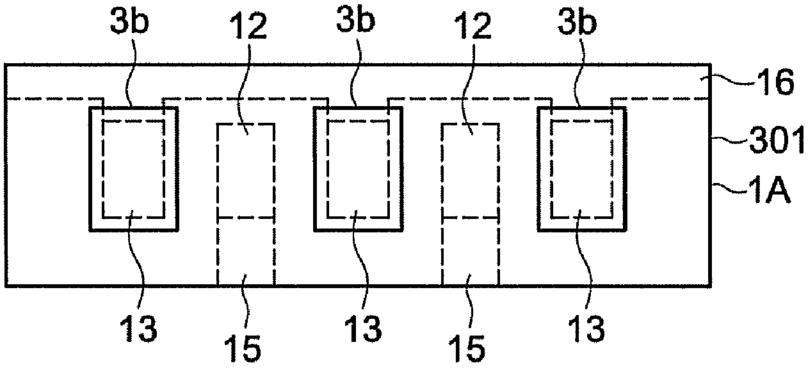

As shown in FIGS. 8(*a*) and (*b*), positioning steps are taken to ensure that the organic film 301 is brought in contact with the head chip 1A and the position of each mask layer 3*b* conforms to the position of each air channel 13 of the head chip 1A. Then the lamination film 300 having been obtained is bonded on the rear side of the head chip 1A using an epoxy based adhesive.

This is followed by the step of removing the exposed organic film 301 by dry etching wherein this mask layer 3*b* is used as a mask.

A specific dry etching method can be selected as appropriate in conformity to the resin used in the organic film 301. When polyimide is used as the organic film 301, for example, in this embodiment, oxygen plasma can be used for dry etching. A parallel tabular RF plasma apparatus is used. After vacuum exhaustion, 50 sccm of oxygen gas is supplied and the valve is adjusted so that pressure is 10 Pa. High frequency with a frequency of 13.56 MHz and power of 500 watts is applied, and the organic film 301 made of polyimide is decomposed and removed in about ten minutes by the oxygen plasma having been generated.

Figure 9:
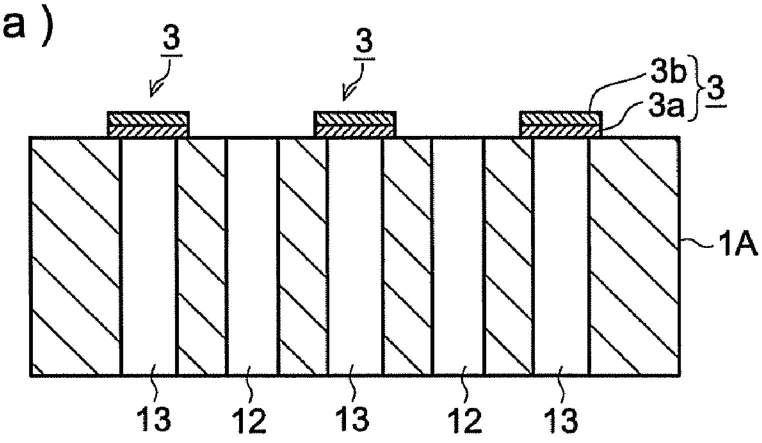
FIG. 9 is a diagram representing the flow path regulating member manufacturing process, wherein (*a*) is a cross sectional view showing that an organic film is dry-etched, and (*b*) is a rear side view of the head chip.
Figure 9:
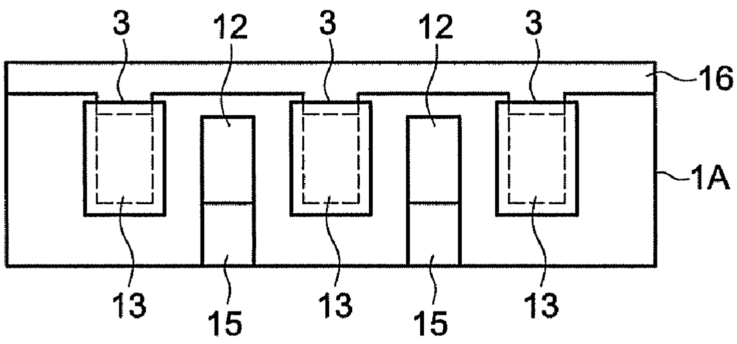

During this dry etching, the mask layer 3*b* is not decomposed, and the organic film 301 below the mask layer 3*b* remains without being dry-etched. It becomes an organic film layer 3*a*, as shown in FIGS. 9(*a*) and (*b*). Thus, a rectangular flow path regulating member 3 made of the lamination between this organic film layer 3*a* and mask layer 3*b* is obtained independently for each air channel 13.

The drive electrode 14 is not illustrated in FIG. 8 and FIG. 9

After that, the mask layer 3*b* of the flow path regulating member 3 can be removed further by etching, but this is not necessary.

In the aforementioned method, the lamination film 300 wherein the mask layer 3*b* is patterned on the surface of organic film 301 is bonded on the rear side of the head chip 1A. It is also possible to make such arrangements that a layer serving as a mask layer 3*b* such as a metallic film 302 is formed on the entire surface of the organic film 301, and this is bonded on the rear side of the head chip 1A. After that, the mask layer 3*b* can be formed by patterning through etching. When this method is employed, the presence of a layer serving as the mask layer 3*b* eliminates the possibility of the organic film 301 being elongated by heat and pressure at the time of bonding the lamination film 300, with the result that the mask layer 3*b* is not misaligned with the air channel 13. Moreover, the pattern of the mask layer 3*b* is transferred using a photo mask. The photo mask is positioned with reference to the head chip 1A by means of an exposure apparatus. This positioning can be achieved to an accuracy of several microns. This high accuracy cannot possibly be achieved by other conventional methods.

In this case, if the metallic film is used as a mask layer 3*b*, the drive electrode 14 of the head chip 1A may be damaged at the time of wet etching. To prevent this, the metallic film should be made of the metal different from that used in the drive electrode 14 of the head chip 1A, to ensure that the drive electrode 14 will not be damaged at the time of wet etching.

After only the organic film 301 has been bonded on the rear side of the head chip 1*b*, the mask layer 3*b* can be formed by patterning the metallic film and others on the surface thereof by sputtering on an selective basis.

As described above, in the present invention, the lamination film 300 is provided on the rear side of the head chip 1A, wherein this lamination film 300 is formed by the step wherein the mask layer 3*b* which has not been etched at the time of etching of the organic film 301 is patterned on the surface of the organic film 301. After this lamination film 300 has been formed, etching is provided from the side of the mask layer 3*b*, and the organic film 301 at other than the site coated with the mask layer 3*b* is removed, whereby the flow path regulating member 3 is formed. The lamination film 300 is bonded on the rear side of the head chip 1A when the lamination film 300 has no opening of the ink inlet and others before patterning by etching. Thus, there is no possibility of the adhesive oozing out of the opening that might result in insufficient adhesive, even if adhesive has been coated. This means that there is no need of coating a large amount of adhesive. Further, to avoid the problem of the adhesive oozing out of the opening, the present invention allows contact pressure to be performed at the time of bonding, whereby reliable bonding is ensured.

Even if the adhesive has oozed out at the time of bonding the lamination film 300, unwanted adhesive can be decomposed and removed simultaneously in the subsequent step of dry etching of the organic film 301. This arrangement solves the problem of the channel being blocked by the excess adhesive or the electrode surface being covered therewith.

Since the normal patterning technique can be used, a high-precision flow path regulating member 3 can be formed at reduced costs.

In the present invention, the organic film 301 at other than the site masked by the mask layer 3*b* can be removed entirely by dry etching. Thus, when the film is bonded on the rear side of the head chip 1A, the outer shape can be made greater than the size of the rear side of the head chip 1A. This signifies substantially improved workability. In the conventional way of bonding the flow path regulating member, the size of the flow path regulating member must be determined to conform to the rear side of the head chip in advance, and the member must be formed in a size smaller than that of the head chip to ensure that the electrode pulled out and formed on the rear side of the head chip will not be covered. This makes it very difficult to achieve high-precision bonding of the flow path regulating member. Moreover, the flow path regulating member with an ink inlet having been formed in advance has been weakened, and tends to be deformed by the slightest force. This results in difficult bonding work, namely, difficult bonding by high precision positioning. However, all these problems are solved by the present invention.

Figure 10:
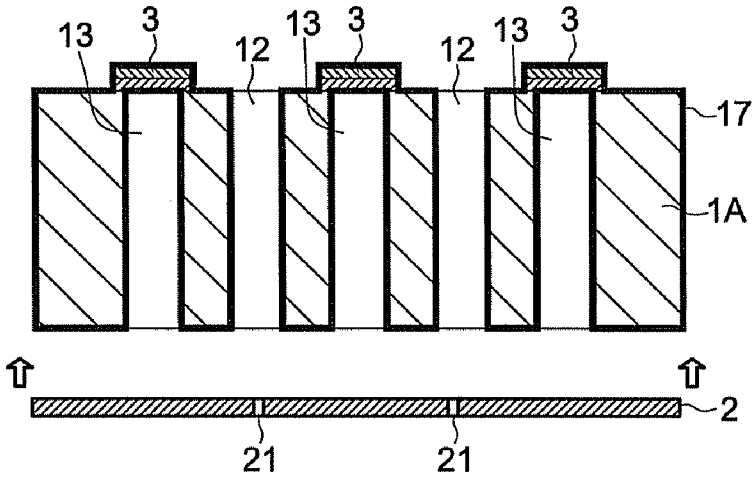
FIG. 10 is a diagram showing the head chip manufacturing process.

Incidentally, the drive electrode 14 in the ink channel 12 is brought in direct contact with ink. Accordingly, when water based ink is used, a protective film must be coated on the surface of the drive electrode 14. Further, the flow path regulating member 3 is also brought in direct contact with ink. When a solvent based ink is used, it is necessary to provide a protective film to protect the flow path regulating member 3 from the solvent. After the flow path regulating member 3 has been formed in the aforementioned manner, all the surfaces of the head chip 1A, namely, the surface of each drive electrode 14 and the surface of the flow path regulating member 3 are preferably coated with a protective film 17, as shown in FIG. 10. Here the drive electrode 14 is not illustrated.

A film made of paraxylylene and derivatives thereof (hereinafter referred to as "parylene film 17) is preferably used as a protective film 17 for coating. The parylene film 17 is a resin film made of a polyparaxylylene resin and/or its derivative resin. It is formed by the Chemical Vapor Deposition: CVD method) wherein the solid diparaxylylene dimer or its derivative is a source of vapor deposition. To be more specific, the paraxylylene radical produced by vaporization and thermal decomposition of the diparaxylylene dimer is adsorbed on the surface of the head chip 1A, and a film is formed by polymerization.

There are various types of parylene films 17. In response to required performances, various forms of parylene films, or a multi-layer parylene film made of a plurality of these parylene films laminated one on top of the other can be used as a desired parylene film 17.

Such a parylene film 17 preferably has a thickness of 1 μm through 10 μm.

The parylene film 17 permeates fine areas to form a film. Thus, if the head chip 1A is coated before the nozzle plate 2 is connected, the drive electrode 14 as well as the flow path regulating member 3 are protected against ink since both the inner surface facing the interior of the air channel 13 and the outer surface exposed to the rear side of the head chip 1A are coated with the parylene film 17.

The flow path regulating member 3 is protected on both sides by the formation of this parylene film 17, with the result that the durability is greatly improved.

Even though a pin-hole occur to the parylene film 17 for coating the flow path regulating member 3 so that the solvent based ink permeates, the parylene film 17 per se does not dissolve, and continues to be present on both surfaces of the flow path regulating member 3. Thus, it does not lose the function as the flow path regulating member 3, and its reliability is maintained for a long period of time.

Moreover, as in the present embodiment, the flow path regulating member 3 is formed independently for each air channel 13. Thus, the adverse effect of a pin-hole having occurred to the parylene film 17 is restricted to the flow path regulating member 3 alone, so that the flow path regulating members 3 of other air channels 13 are not affected. This arrangement provides an advantage that the damage is kept to a minimum.

Needless to say, regardless of the presence or absence of the parylene film 17, the flow path regulating member 3 is formed independently for each air channel 13. This arrangement ensures that other flow path regulating members 3 are not affected, even if separation or other defects have occurred to any of the flow path regulating members 3. As described above, when these flow path regulating members 3 are to be formed independently for respective channels, they must be bonded one by one according to the conventional method, and this involves difficult work. In the present invention, however, they can be formed in one operation when they are formed independently for respective channels. This arrangement provides the aforementioned advantages easily.

After the parylene film 17 has been formed in the aforementioned manner, the nozzle plate 2 is connected to the front side of the head chip 1A, as shown in FIG. 10.

Figure 11:
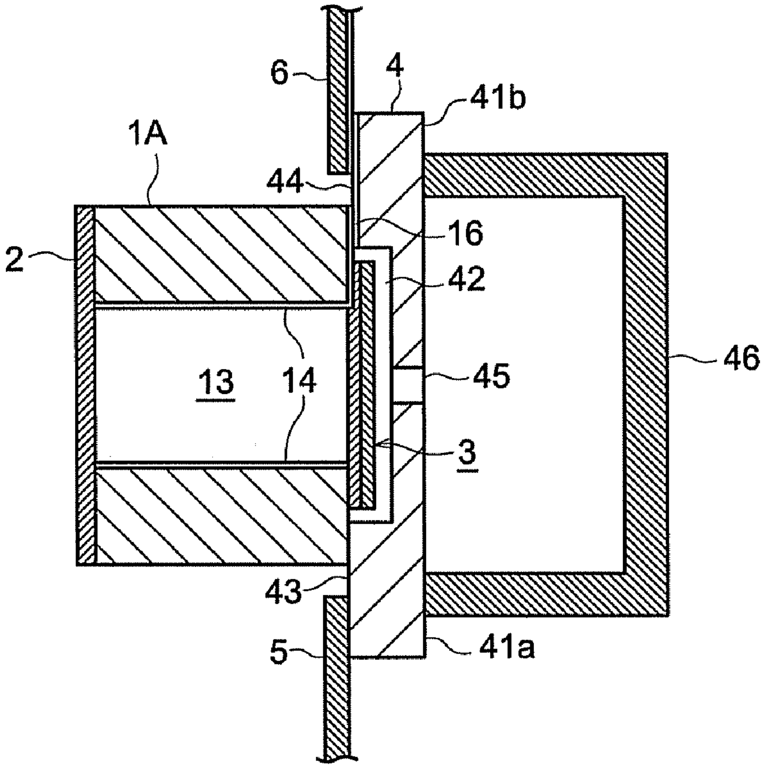
FIG. 11 is a cross sectional view representing an example of the inkjet head.

The wiring board 4, for example, as shown in FIG. 11, is connected to the rear side of the head chip 1A, whereby the connection electrode 15 and common electrode 16 formed on the rear side of the head chip 1A are electrically connected with the drive circuit (not illustrated).

FIG. 11 is a cross sectional view wherein the head chip 1A connected with the wiring board 4 is cut at the air channel 13.

The wiring board 4 is formed of a plate-formed substrate which is made up of a ceramic material such as a nonpolarizable PZT, AIN-BN and AIN. Plastic, glass of low thermal expansion or the like can also be used. Further, the same substrate material as that of the piezoelectric element substrate used in the head chip 1 can be used by depolarization. Further, to reduce the distortion of the head chip 1 resulting from the difference in coefficient of thermal expansion, the material is preferably selected so that the difference in the coefficient of thermal expansion from the head chip 1A will be kept within ±1 ppm. The number of the materials constituting the wiring board 4 is not restricted to one. Several sheets of thin plate-formed substrate materials can be laminated to get a desired thickness.

The wiring board 4 extends in the direction perpendicular to the direction of a row of the channels of the head chip 1A (in the vertical direction in FIG. 11). The overhangs 41*a* and 41*b* that hang substantially over the upper side and lower side of the head chip 1A are provided. Further, one concave portion 42 extending across the width (in the direction of channel row) is formed on one surface of the wiring board 4 connected with the rear side of the head chip 1A. This concave portion 42 is provided with a groove large enough to cover the apertures 122 and 132 on the rear side of all the channels 12 and 13 in the direction of the channel row of the head chip 1A. This constitutes a common ink chamber for supplying ink equally to each of the ink channels 12 (not illustrated in FIG. 11).

To be more specific, as shown in FIG. 11, the height of the concave portion 42 in the vertical direction of the drawing is greater than that of each of the channels 12 and 13, and is smaller than the thickness perpendicular to the direction of the channel row of the head chip 1A. Thus, when the wiring board 4 is connected with the rear side of the head chip 1A, the apertures 122 and 132 on the rear side of each of the channels 12 and 13 faces inside the concave portion 42.

The flow path regulating member 3 is built in this concave portion 42. To be more specific, the wiring board 4 is connected to a very narrow area on the rear side of the head chip 1A where the flow path regulating member 3 is not provided. This area is very close to each of the channels 12 and 13 (e.g., the distance is 0 through 200 μm). This requires a very difficult and high-precision positioning work when one plate-formed flow path regulating member is connected in the conventional manner. However, in the present invention, the flow path regulating member 3 can be formed by patterning technique. This arrangement ensures high-precision positioning, as described above, and allows the channels 12 and 13 to be easily formed in a very close position. Further, the present invention easily provide an area for electrical connection between each connection electrode 15 (not illustrated in FIG. 11) and common electrode 16. Needless to say, even if adhesive oozes out into this area, it is decomposed and removed at the time of dry etching. Thus, electrical connection is immune to any trouble.

One of the overhangs 41*a* of the wiring board 4 is provided with the wired electrodes 43 (not illustrated in FIG. 11) each having the same number and same pitch as those of the connection electrodes 15 formed on the rear side of the head chip 1A. The other overhang 41*b* is provided with a wired electrode 44 for connection with the common electrode 16 formed on the rear side of the head chip 1A. The wiring board 4 is connected to the rear side of the head chip 1A by an anisotropic conductive film or the like so that each of the wired electrodes 43 will be electrically connected with each of the connection electrodes 15, and the wired electrode 44 is electrically connected with the common electrode 16.

When a wiring board 4 is connected to the rear side of the head chip 1A, ink can be supplied to the concave portion 42 serving as a common ink chamber from both ends of the concave portion 42 or one of the ends. It is also possible to form an opening 45 leading from the bottom of the concave portion 42 to the surface opposite to the surface for connection with the head chip 1A, and to further connect a box-shaped ink manifold 46 capable of storing the ink in the amount greater than that of the concave portion 42, as shown in FIG. 11.

When a wiring board 4 is connected to the rear side of the head chip 1A, the aforementioned parylene film 17 is formed preferably before the nozzle plate 2 is connected to the head chip 1A after the wiring board 4 has been connected to the head chip 1A. This arrangement ensures electrical connection between each of the connection electrodes 15 and common electrodes 16, and each of the wired electrodes 43 and 44, and allows a protective film to be formed on the surface of the wired electrodes 43 and 44 facing the concave portion 42 of the wiring board 4 which will be brought in direct contact with ink.

Figure 12:
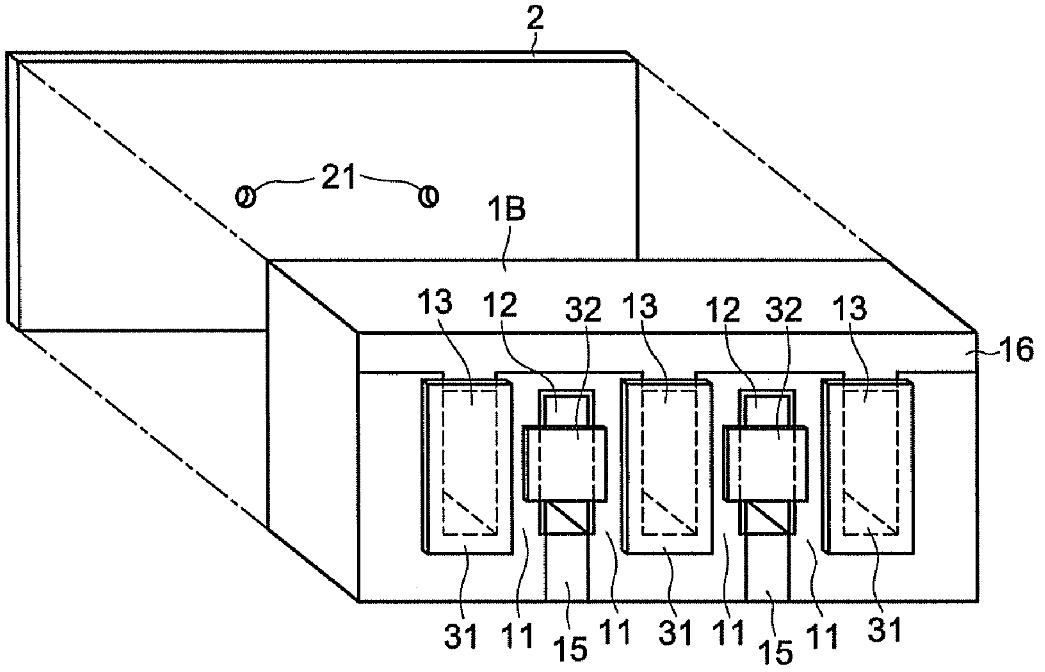
FIG. 12 is a perspective view showing the head chip portion of the inkjet head as a second embodiment as viewed from the rear side.
Figure 13:
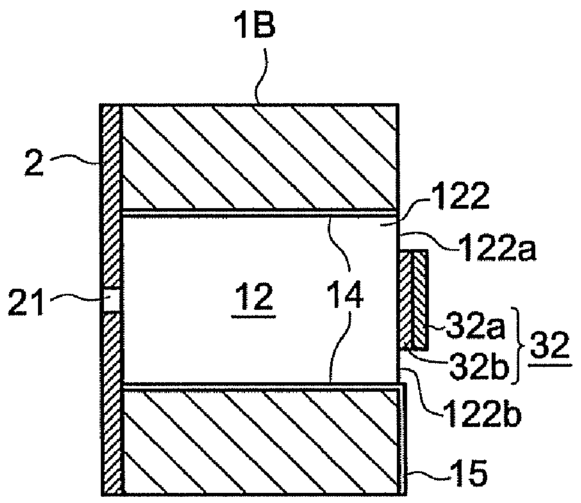
FIG. 13(*a*) is a cross sectional view of the ink channel of the inkjet head of FIG. 12, with FIG. 13(*b*) being a cross sectional view of an air channel.
Figure 13:
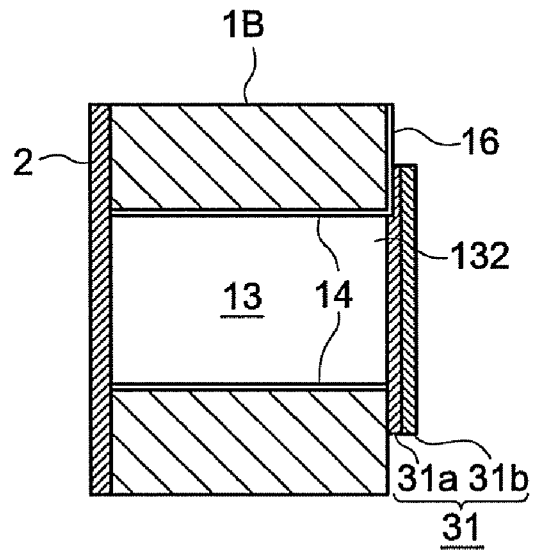

The following describes the second embodiment of the inkjet head of the present invention:

FIG. 12 is a perspective view of the head chip of the inkjet head of the second embodiment, as viewed from the rear side. FIG. 13(*a*) is a cross sectional view showing the ink channel 12 of the inkjet head of FIG. 12, and FIG. 13(*b*) is a cross sectional view of the air channel 13.

The same reference numerals in FIGS. 1 and 2 are assigned to the same components, which will not be described in details to avoid duplication. Further, the method of manufacturing this head chip 1B is the same as that of FIG. 3 and FIG. 4.

In the inkjet head of the second embodiment, the same flow path regulating member 31 as the flow path regulating member 3 in the first embodiment is formed in each air channel 13 of the head chip 1B. At the same time, each ink channel 12 is provided with a flow path regulating member 32 independently so as to reduce the area of the aperture 122 on the rear side thereof.

To be more specific, the flow path regulating member 31 formed to conform to each air channel 13 is formed of a laminate made up of an organic film layer 31*a* on the side in contact with the head chip 1B and the mask layer 31*b* on the surface thereof, whereby the aperture 132 on the rear side of each air channel 13 is completely blocked. The flow path regulating member 32 formed to conform to each of the ink channels 12 is formed of a laminate made up of an organic film layer 32*a* on the side in contact with the head chip 1B and the mask layer 32*b* on the surface thereof. Part of the aperture 122 on the rear side of each of the ink channels 12 is exposed to reduce the area of the aperture.

In this flow path regulating member 32, the direction of width in the direction of the channel row is slightly greater than the width of the ink channel 12, and the vertical direction perpendicular to the direction of width is smaller than the height of the ink channel 12. Accordingly, the aperture area is reduced by the flow path regulating member 32 to ensure that only the top end and bottom end of each of the apertures 122 on the rear side of the ink channel 12 will open.

The flow path regulating member 32 conforming to this ink channel 12 is only required to be formed by patterning, simultaneously with the formation of the flow path regulating member 31 conforming to the air channel 13, using the same procedure as that for forming a flow path regulating member 3 in the first embodiment. Since this flow path regulating member 32 is also formed by patterning, this arrangement ensures high-precision reduction in the area of the aperture 122 on the rear side of each of the ink channels 12.

When the wiring board 4 is to be connected after the flow path regulating members 31 and 32 have been formed as in the case of FIG. 11, a parylene film 17 is preferably formed on all the surfaces of the head chip 1B, namely, on the surface of each of the drive electrode 14 and the surfaces of the flow path regulating members 31 and 32, subsequent to connection, similarly to the case of FIG. 10.

In the head chip 1B of the second embodiment, the area of the aperture 122 on the rear side of each of the ink channels 12 is reduced by the flow path regulating member 32. This arrangement permits an effective reduction in the vibration of the ink meniscus of the nozzle when the head is driven at a high speed, similarly to the conventional case of using the flow path regulating plate with the ink inlet kept open.

Figure 14:
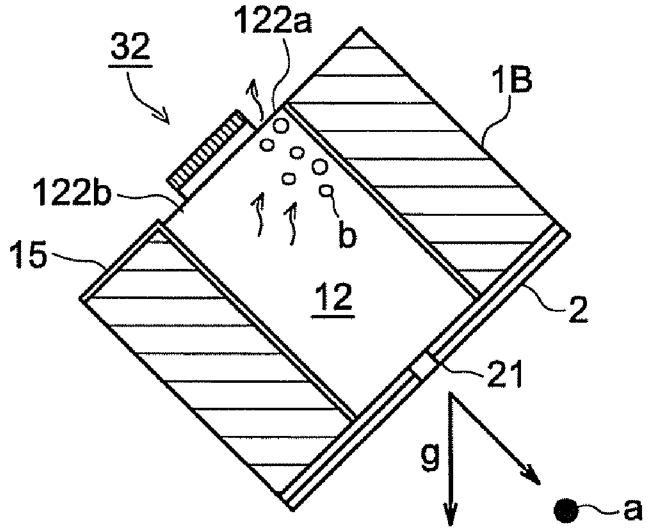
FIG. 14 is a cross sectional view showing the head chip portion when the inkjet head is arranged in a slanting direction.

Moreover, unlike the case of an ink inlet being formed at the center of the aperture of the ink channel as in the conventional art, this flow path regulating member 32 is designed in such a way that the top end and bottom end of the aperture 122 of the ink channel 12 are opened to form the apertures 122*a* and 122*b*. Thus, when the inkjet head is placed in an inclined position, as shown in FIG. 14, so that the direction of emission of ink a will be inclined with respect to the direction of gravity g, the aperture (e.g., aperture 122*a*) which is not blocked by the flow path regulating member 32 is located at the top-most position for the ink channel 12. Accordingly, the bubble b produced in the ink channel 12 is collected to this top-most position and is easily removed from the aperture 122*a* to enter the common ink chamber outside the head chip 1B. Even if there is bubble b inside the common ink chamber, it does not affect ejectionany more. This eliminates the possibility of any problem being caused by bubble b.

The top end and bottom end of this aperture 122 is made to open by the flow path regulating member 32 formed so as to reduce the area of the aperture 122 on the rear side of the of each of the ink channels 12. This arrangement provides a head characterized by excellent bubble removing performance and ejectionreliability.

In each of the ink channels 12, the area of the aperture 122 on the rear side after having been narrowed by the flow path regulating member 32 is preferably 1 through 10 times the aperture area on the emission side of the nozzle 21 formed on the nozzle plate 2, more preferably 2 through 5 times. The optimum value is preferably obtained from the result of an ejectiontest. According to the test made by the present inventors, the optimum area of the aperture 122 on the rear side after having been reduced by the flow path regulating member 32 is 2000 $\mu m^2$ for the head chip having a nozzle diameter of 28 μm (aperture area: 615 $\mu m^2$).

In this case, the flow path regulating member 32 was formed in such a way that both the top end and bottom end of the aperture 122 of the ink channel 12 are opened to form apertures 122*a* and 122*b*, respectively. This arrangement allows the bubble b to be removed independently of whether the upper side or lower side of the head chip 1B is located on the upper position, and does not preferably impose any restriction when the inkjet head is installed in a slanting direction. Without the present invention being restricted thereto, the flow path regulating member 32 can be formed in such a way that either the top end or bottom end alone in the aperture 122 on the rear side of the ink channel 12 is open. In this case, the inkjet head is installed in a slanting direction so that the open side of the apertures 122 on the rear side without being blocked by the flow path regulating member 32 is located on the upper position. This arrangement makes it possible to remove the bubble b.

The first embodiment and the second embodiment use an example of the independent channel type inkjet head wherein the channels arranged side by side on the head chips 1A and 1B were assigned alternately as ink channels 12 and air channels 13. However, in the head chip, all the channels can be used as ink channels 12.

Figure 15:
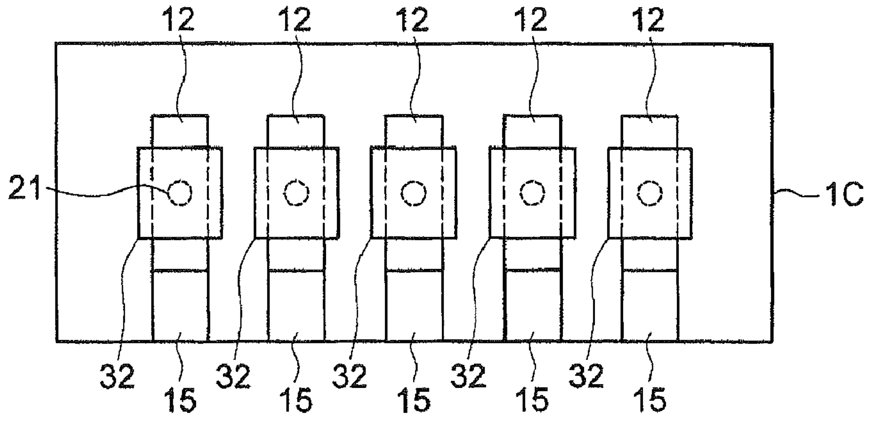
FIG. 15 is a rear side view of the head chip portion of the inkjet head as a third embodiment.
Figure 16:
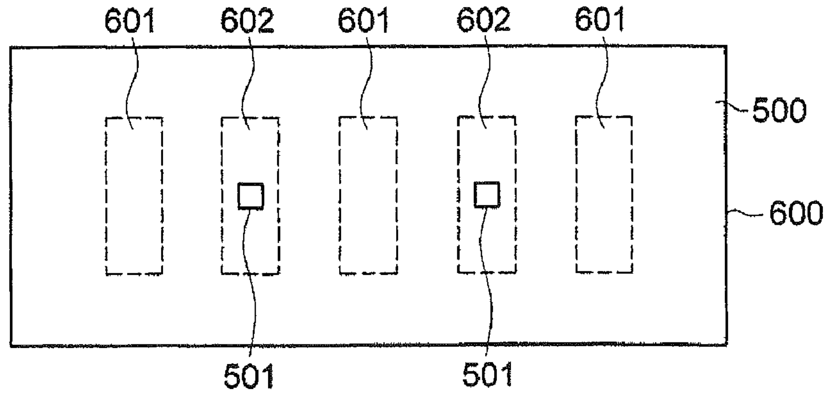
FIG. 16 PRIOR ART
FIG. 16 is a rear side view of the head chip provided with a conventional flow path regulating member.

FIG. 15 indicates the rear side of the head chip 1C in the third embodiment when all the channels are used as ink channels 12. The same reference numerals in FIGS. 1 and 2 indicate the same structure, and will not be described in details. The manufacturing methods of this head chip 1C in FIG. 3 and FIG. 4 are the same, therefore the connection electrodes 15 are formed for all the channels instead of the common electrodes 16 being formed. In this case as well, the drive electrode 14 is not illustrated.

As illustrated in the same drawing, a flow path regulating member 32 formed of the laminate made up of an organic film layer 32*a* and mask layer 32*b* is provided independently on the aperture 122 on the rear side of each of the ink channels 12 so as to reduce the area of the aperture 122. In this case as well, the area of the aperture 122 on the rear side of each of the ink channels 12 is reduced by the flow path regulating member 32 so that the top end and bottom end are open. Thus, similarly to the case of FIG. 14, installation of the inkjet head in a slanting direction ensures easy removal of the bubble from the ink channel 12.

The flow path regulating member 32 can be formed of one flow path regulating member so as to reduce the area of the apertures 122 on the rear sides of all the ink channels 12. In this case as well, as illustrated, if it is formed independently for each ink channel 12, other ink channels 12 are not affected by the problems of any of the flow path regulating members 32.

In this embodiment, it goes without saying that the flow path regulating member 32 can be formed in such a way that either the top end or bottom end alone in the aperture 122 on the rear side of the ink channel 12 is open.

In the aforementioned description, the head chips 1A, 1B and 1C constituting the inkjet head each have only one channel row. However, a plurality of channel rows can be used. In this case, the flow path regulating members 3, 31 and 32 can be applied in the same manner.

The aforementioned embodiment provides a method of manufacturing the inkjet head wherein a flow path regulating member can be pressed and firmly bonded on the rear side of a harmonica type head chip, without any possibility of the channel being blocked by adhesive, or the adhesive being oozed out.

Further, the aforementioned embodiment provides a method of manufacturing the inkjet head wherein a flow path regulating member can be pressed and firmly bonded without any possibility of the channel being blocked by adhesive, or the adhesive being oozed out, and wherein bubbles can be easily removed from the channel so that bubbles hardly remain inside, even if the area of the aperture on the rear side of the channel is reduced.

Furthermore, the aforementioned embodiment provides an inkjet head containing the flow path regulating member which can be firmly bonded on the rear side of a harmonica type head chip, without any possibility of the channel being blocked by adhesive, or the adhesive being oozed out.

Still further, the aforementioned embodiment provides an inkjet head containing the flow path regulating member which can be firmly bonded on the rear side of a harmonica type head chip, without any possibility of the channel being blocked by adhesive, or the adhesive being oozed out, wherein bubbles can be easily removed from the channel so that bubbles hardly remain inside, even if the area of the aperture on the rear side of the channel is reduced.

What is claimed is:

1. A manufacturing method of an inkjet head having a head chip wherein channels and drive walls configured with piezoelectric elements are arranged alternately, apertures of the channels are arranged respectively at front side and rear side of the channels in which drive electrodes are formed, and a flow path regulating member are provided at the rear surface of the head chip to regulate ink flow into the channels, wherein shear deformation is caused at the drive walls by applying a voltage so as to emit ink in the channels, the manufacturing method comprising:

- providing a multilayer film to be adhered onto the rear surface of the head chip, wherein a mask layer is patterned on an organic film so that the mask layer not etched by dry etching corresponds to the channels where ink flow is to be regulated; and
- removing a portion of the organic film which is not covered by the mask layer by dry etching from the mask layer side so as to form the flow path regulation member;
- wherein the multilayer film is adhered onto the rear surface of the head chip after patterning the mask layer on a surface of the organic film.

2. The manufacturing method of the inkjet head of claim 1, wherein the head chip is provided with ink channels to emit ink and air channels not to emit ink alternately and the ink flow regulation member is formed so as to close the aperture at rear surface of the air channel.

3. The manufacturing method of the inkjet head of claim 2, wherein the ink flow regulation member is formed so as to reduce opening area of the apertures at the rear side of the ink channel.

4. The manufacturing method of the inkjet head of claim 1, wherein the channels in the head chip are all ink channels to emit ink and the flow path regulation member is formed to reduce an opening area of the apertures at the rear side of the ink channel.

5. The manufacturing method of the inkjet head of claim 1, wherein the flow path regulation member is formed to reduce opening area of the apertures at the rear side of the ink channel in a manner where at least an upper side or a lower side of the aperture is opened.

6. The manufacturing method of the inkjet head of claim 1, wherein the flow path regulation member is formed at the rear surface the chip head, the head chip is coated by a film made of paraxylylene or derivatives thereof including both surfaces of the flow path regulation member, thereafter the nozzle plate is adhered onto the front surface of the head chip.

7. A manufacturing method of an inkjet head having a head chip wherein channels and drive walls configured with piezoelectric elements are arranged alternately, apertures of the channels are arranged respectively at front side and rear side of the channels in which drive electrodes are formed, and a flow path regulating member are provided at the rear surface of the head chip to regulate ink flow into the channels, wherein shear deformation is caused at the drive walls by applying a voltage so as to emit ink in the channels, the manufacturing method comprising:

providing a multilayer film to be adhered onto the rear surface of the head chip, wherein a mask layer is patterned on an organic film so that the mask layer not etched by dry etching corresponds to the channels where ink flow is to be regulated; and removing a portion of the organic film which is not covered by the mask layer by dry etching from the mask layer side so as to form the flow path regulation member;

wherein the flow path regulation member is formed independently for each channel.

8. The manufacturing method of the inkjet head of claim 7, wherein after covering an entire surface of the organic film by the multilayer film representing a member to be the mask layer, the organic film is adhered on the rear surface of the head chip, and the member to be the mask layer is patterned to form the mask layer.

9. An inkjet head, wherein shear deformation is caused at drive walls by applying a voltage so as to emit ink in channels, comprising:

a head chip wherein the channels and the drive walls configured with piezoelectric elements are arranged alternately, apertures are arranged respectively at a front surface and rear surface of the head chip, and drive electrodes are formed in each channel; and a flow path regulating member arranged at the rear surface of the head chip to regulate ink flow into the channels, wherein the flow path regulating member is formed by a multilayer which is made in a way where a mask layer which cannot be etched by dry etching is formed on a surface of an organic film and the multilayer is etched by dry etching;

wherein the flow path regulation member is formed independently for each channel.

10. The inkjet head of claim 9, wherein both surfaces of the flow path regulation member are coated by a film made of paraxylylene or derivatives thereof.

11. The inkjet head of claim 9, wherein ink channels to emit ink and air channels not to emit ink are arranged alternately and the flow path regulation member is formed to close the apertures at the rear side of the air channel.

12. The inkjet head of claim 11, wherein the flow path regulation member is formed to reduce opening area of the apertures at the rear side of the ink channels.

13. The inkjet head of claim 9, wherein the channels in the head chip are all ink channels to emit ink and the flow path regulation member is formed to reduce opening area of the apertures at the rear side of the ink channel.

14. The inkjet head of claim 12, wherein the flow path regulation member is formed to reduce the opening area of the apertures at the rear side of the ink channel in a manner where at least an upper end or a lower end of the aperture is opened.

* * * * *